United States Patent
Jeol et al.

(10) Patent No.: US 10,808,077 B2
(45) Date of Patent: Oct. 20, 2020

(54) (CO)POLYAMIDES OBTAINABLE FROM 1,4-CYCLOHEXANEDICARBOXYLIC ACID AND A DIAMINE OF FORMULA $H_2N\text{-}(CH_2)_2\text{-}O\text{-}(CH_2)_2\text{-}O\text{-}(CH_2)_2\text{-}NH_2$

(71) Applicant: SOLVAY SPECIALTY POLYMERS USA, LLC, Alpharetta, GA (US)

(72) Inventors: Stéphane Jeol, Cumming, GA (US); Nancy J. Singletary, Alpharetta, GA (US)

(73) Assignee: SOLVAY SPECIALTY POLYMERS USA, LLC, Alpharetta, GA (US)

(*) Notice: Subject to any disclaimer, the term of this patent is extended or adjusted under 35 U.S.C. 154(b) by 0 days.

(21) Appl. No.: 16/089,097

(22) PCT Filed: Mar. 27, 2017

(86) PCT No.: PCT/EP2017/057199
§ 371 (c)(1),
(2) Date: Sep. 27, 2018

(87) PCT Pub. No.: WO2017/167692
PCT Pub. Date: Oct. 5, 2017

(65) Prior Publication Data
US 2019/0062499 A1    Feb. 28, 2019

Related U.S. Application Data

(60) Provisional application No. 62/316,835, filed on Apr. 1, 2016, provisional application No. 62/419,035, filed on Nov. 8, 2016.

(51) Int. Cl.
| | | |
|---|---|---|
| C08G 69/40 | (2006.01) | |
| C08G 69/26 | (2006.01) | |
| B33Y 40/00 | (2020.01) | |
| C09D 177/06 | (2006.01) | |

(52) U.S. Cl.
CPC ............ *C08G 69/40* (2013.01); *B33Y 40/00* (2014.12); *C08G 69/26* (2013.01); *C09D 177/06* (2013.01); *C08G 2150/00* (2013.01)

(58) Field of Classification Search
CPC .... C08G 2150/00; C08G 69/26; C08G 69/40; C08G 69/44; C08G 65/3324; C08G 65/323; C08G 18/5021; C08G 18/603; C09D 177/06; Y10S 264/61; Y10S 264/01661; C08L 77/00; C08L 71/02; C10M 2217/044; C11D 3/3719

USPC ........ 525/420; 528/339, 340, 343, 346, 349, 528/183; 428/367; 564/152; 264/DIG. 61
See application file for complete search history.

(56) References Cited

U.S. PATENT DOCUMENTS

| | | | |
|---|---|---|---|
| 2,939,862 A | 6/1960 | Caldwell et al. | |
| 4,374,741 A | 2/1983 | Rieder | |
| 4,946,933 A | 8/1990 | Speranza et al. | |
| 6,492,458 B1 | 12/2002 | Pavlin | |
| 2004/0186263 A1* | 9/2004 | Pavlin | C08G 69/40 |
| | | | 528/232 |
| 2008/0070025 A1 | 3/2008 | Pavlin | |
| 2009/0130041 A1 | 5/2009 | MacQueen et al. | |
| 2010/0064933 A1 | 3/2010 | Pavlin | |

FOREIGN PATENT DOCUMENTS

EP    1857097 A1    11/2007

OTHER PUBLICATIONS

Standard ASTM D3418, "Standard Test Method for Transition Temperatures and Enthalpies of Fusion and Crystallization of Polymers by Differential Scanning Calorimetry", 2008, p. 1-7.
Murphy J., in "Additives for Plastics Handbook", 2nd Edition, 2001, Chapter 5.2.3., p. 43-48—Elsevier Advanced Technology.
JEFFAMINE® Polyetheramines Technical Bulletin from HUNTSMAN copyrighted in 2012 and identified as 5341-1012R1, extracted online on Apr. 8, 2020 via http://www.huntsman.com/performance_products/a/Products/Amines/Polyetheramines%20%20%20JEFFAMINE_R.

* cited by examiner

*Primary Examiner* — Camie S Thompson
(74) *Attorney, Agent, or Firm* — Beatrice C. Ortego

(57) ABSTRACT

The present invention relates to (co)polyamides comprising at least 60 mol. % of recurring units of formula (I): (I). The present invention also relates to polymer compositions comprising such (co)polyamides, as well as articles comprising the same and methods of using said articles in high temperature applications requiring sufficient swelling or deformation upon exposure to moisture, such as for example oil and gas extraction processes (e.g. fracturing balls), or as support materials used to print three-dimensional (3D) parts.

(I)

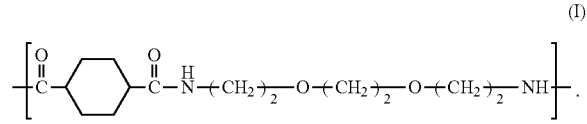

16 Claims, No Drawings

(CO)POLYAMIDES OBTAINABLE FROM 1,4-CYCLOHEXANEDICARBOXYLIC ACID AND A DIAMINE OF FORMULA $H_2N\text{-}(CH_2)_2\text{-}O\text{-}(CH_2)_2\text{-}O\text{-}(CH_2)_2\text{-}NH_2$

RELATED APPLICATIONS

This application claims priority to U.S. provisional application No. 62/316,835 filed on Apr. 1, 2016 and to U.S. provisional application No. 62/419,035 filed on Nov. 8, 2016, the whole content of each of these applications being incorporated herein by reference for all purposes.

TECHNICAL FIELD

The present invention relates to (co)polyamides comprising at least 60 mol. % of recurring units of formula (I):

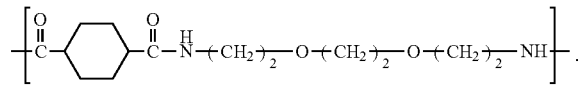

The present invention also relates to polymer compositions comprising such (co)polyamides, as well as articles comprising the same and methods of using said articles in high temperature applications requiring sufficient swelling or deformation upon exposure to moisture, such as for example oil and gas extraction processes (e.g. fracturing balls), or as support materials used to print three-dimensional (3D) parts.

BACKGROUND ART (Co)polyamides having a high melting temperature, for example above 300° C., are known and described in the literature. Polyamides of this type are notably known from Solvay Specialty Polymers USA, under the trade name Amodel® PPA. These polyamides also present a low water absorption rate which is, in many applications, a useful advantage, notably because of the resulting strength and stiffness stability, even with high levels of humidity.

In some applications however, such as the ones depicted below, there is need for (co)polyamides presenting high melting temperatures, but at the same time presenting water-absorption behaviour such as to swell or deform when submitted to high humidity environments or even able to dissolve when immerged into water. The merit of the applicant has been to surprisingly identify a combination of components to prepare (co)polyamides showing such advantageous properties. More precisely, the applicant has now found that such (co)polyamides can be obtained from the condensation of a diamine of formula $H_2N$—$CH_2CH_2$—$O$—$CH_2CH_2$—$O$—$CH_2CH_2$—$NH_2$ with a 1,4-cyclohexanedicarboxylic acid (1,4-CHDA).

Several prior art documents relate to polyamides obtained from the condensation of aliphatic diamines with short chain dicarboxylic acids.

One of them, U.S. Pat. No. 2,939,862 (Eastman Kodak), relates to highly polymeric linear fiber-forming copolyamides having melting temperatures which can be derived by condensing one mole proportion of trans-1,4-cyclohexanedicarboxylic acid (1,4-CHDA) with one mole proportion of a mixture containing a major proportion of a bifunctional ether-type diamine of formula $NH_2$—R—O—R'—O—R—$NH_2$ in which R is a polymethylene radical containing from 3 to 6 carbon atoms and a minor proportion of an upgrading diamine.

U.S. Pat. No. 4,374,741 (Cincinnati Milacron Inc) relates to water-soluble polyamide derivatives of a polyoxalkylene diamine having the following formula:

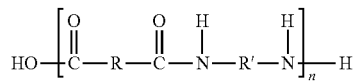

wherein:
R is a divalent aliphatic, aromatic, arylaliphatic, alkylaromatic, cycloaliphatic, heteroaliphatic having oxygen or sulfur heterochain atoms, heterocyclic having one to two oxygen, sulfur or nitrogen hetero ring atoms and from 5 to 6 ring atoms or bicyclic radical or the halogenated derivatives of said divalent radical,
R' is a divalent polyoxyalkylene homopolymer or copolymer radical, and
n is 2 to 10.
Example 34 of this document pertains to a copolyamide of 1,4-CHDA and a propylene oxide-terminated diamine, i.e. a diamine wherein the amine groups are of formula —O—$CH_2$—$CH(CH_3)$—$NH_2$ (amine groups are bound to a secondary carbon atom).

U.S. Pat. No. 4,946,933 (Texaco Chemical Company) pertains to thermoplastic adhesives prepared from polycondensation of three components: (1) polyoxyethylene diamines, (2) dimer fatty acids having greater than or equal to 36 carbons, present in a range of about 5 to 40 mol. % based upon total moles present in the polymer and (3) short chain dicarboxylic acids. Preferred polyoxyethylene diamine are those of formula $H_2N$—$(CH_2CH_2O)_n$—$CH_2CH_2$—$NH_2$ in which n=2 or 3. The short chain dicarboxylic acid has the general formula: HOOC—R'—COOH where R' is an aliphatic, cycloaliphatic and aromatic hydrocarbon radical having from 3 to about 15 carbon atoms. Adipic acid is used in all of the examples.

US 2008/0070025 pertains to certain hair treatment/shampooing compositions comprising: a cross-linked polymeric matrix which is a reaction product of a compound having at least one and preferably two or more functional groups selected from the group consisting of epoxy, isocyanate, anhydride and acrylate with a polyamine compound in the presence of an active liquid and optionally water. The polyamine is generally an ether-based polyamide polyamine ("PAPA") obtained by reacting a polyacid with an excess polyetherpolyamine, possibly admixed with other diamines. Among PAPA which are solids at room temperature, mention is made of PAPA resulting from the reaction of a major diacid portion of 1,4-cyclohexane dicarboxylic acid (1,4-CHDA), an a stoichiometric excess of a poly(alkyleneoxy) polyamine chosen from the group of three specific propylene oxide-terminated diamines, i.e. diamines wherein the amine groups are of formula —O—$CH_2$—$CH(CH_3)$—$NH_2$ (amine groups bound to a secondary carbon atom).

EP 1 857 097 A1 pertains to ethanol soluble or dispersible polyetheramide polymers formed from a reaction mixture comprising at least one or more poly(alkyleneoxy) diamines (PAODAs) and one or more diacids, which have application in personal care compositions such as hair fixative compositions, for example, hair spray formulations. Exemplary PAODAs are all propylene oxide-terminated diamines, i.e.

diamines wherein the amine groups are of formula —O—CH$_2$—CH(CH$_3$)—NH$_2$ (amine groups bound to a secondary carbon atom).

None of the above-listed documents describe (co)polyamides comprising at least 60 mol. % of recurring units of formula (I):

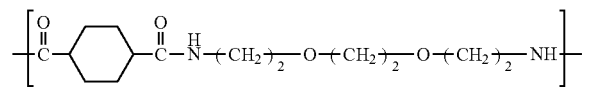

for example obtained from the condensation of a diamine of formula H$_2$N—CH$_2$CH$_2$—O—CH$_2$CH$_2$—O—CH$_2$CH$_2$—NH$_2$ with a 1,4-cyclohexanedicarboxylic acid (1,4-CHDA). The applicant has surprisingly found that such (co)polyamides not only present high melting temperatures (i.e. above 260° C.), but also possess a water absorption behaviour, or even a solubility in water at a temperature lower than 110° C. Such technical features enable their uses not only in high temperature applications or in applications requiring sufficient swelling or deformation upon exposure to moisture, but also in applications requiring both a high temperature resistance and sufficient swelling or deformation upon exposure to moisture (e.g. oil and gas extractions, 3D printing).

DISCLOSURE OF THE INVENTION

The present invention relates to (co)polyamides comprising at least 60 mole % (mol. %) of recurring units (R$_{PA}$) of formula (I):

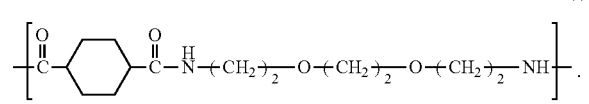

The expressions "(co)polyamides" or "polyamides" are hereby used for designating:

homopolyamides containing substantially 100 mol. % of recurring units (R$_{PA}$) of formula (I) and copolyamides comprising at least about 60 mol. % of recurring units (R$_{PA}$) of formula (I), for example at least about 65 mol. %, at least about 70 mol. %, at least about 75 mol. %, at least about 80 mol. %, at least about 85 mol. %, at least about 90 mol. %, at least about 95 mol. % or at least about 98 mol. %.

The (co)polyamides of the present invention may have a number average molecular weight M$_N$ ranging from 1 000 g/mol to 40 000 g/mol, for example from 2 000 g/mol to 35 000 g/mol or from 4 000 to 30 000 g/mol. The number average molecular weight can be determined by gel permeation chromatography (GPC) using ASTM D5296 with polystyrene standards.

According to an embodiment of the present invention, the (co)polyamide is the condensation product of a mixture comprising:

1,4-cyclohexanedicarboxylic acid of formula (II)

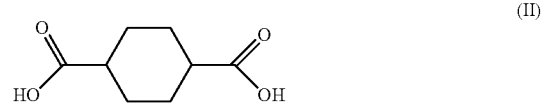 [SMILES: O=C(O)C1CCC(C(=O)O)CC1]

a diamine of formula (III):

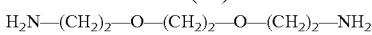

(III)

optionally at least one diacid [acid (DA)] (or derivatives thereof) distinct from the diacid of formula (II), and optionally at least one diamine [amine (NN)] (or derivatives thereof) distinct from the diamine of formula (III).

According to this embodiment, the diacid [acid (DA)] can be chosen among a large variety of aliphatic or aromatic components comprising at least two acidic moieties —COOH and can notably comprise heteroatoms (e.g. O, N or S). According to this embodiment, the diamine [amine (NN)] can be chosen among a large variety of aliphatic or aromatic components comprising at least two amine moieties —NH$_2$ and can notably comprise heteroatoms (e.g. O, N or S).

The (co)polyamides of the present invention may comprise less than about 40 mol. % of at least one recurring units (R$_{PA*}$) distinct from the recurring unit (R$_{PA}$) of formula (I).

According to an embodiment of the present invention, the recurring units (R$_{PA*}$) are selected from the group consisting of:

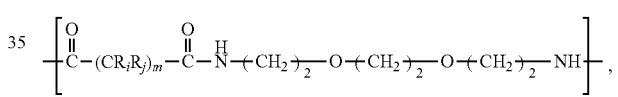

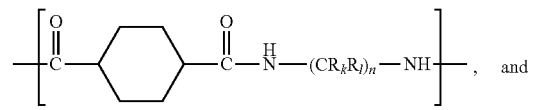

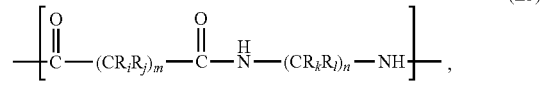

wherein:
each R$_i$, R$_j$, R$_k$, and R$_l$ on each carbon atom is independently selected from a hydrogen, a halogen, an alkyl, an alkenyl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, and any combination thereof;
m is an integer from 0 to 10;
n is an integer from 6 to 12.

According to another embodiment, the copolyamide is the condensation product of the mixture comprising:

1,4-cyclohexanedicarboxylic acid of formula (II)

a diamine of formula (III):

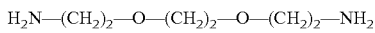

(III) and
at least one of:
  an aliphatic diacid ($DA_{al}$) or derivative thereof (acid halogenides, especially chlorides, acid anhydrides, acid salts, acid amides) or
  an aromatic diamine ($NN_{ar}$) or derivative thereof.

According to this embodiment, the copolyamide may for example be the condensation product of a mixture comprising 1,4-CHDA (II), the diamine of formula (III), at least one aliphatic diacid ($DA_{al}$) and at least one aromatic diamine ($NN_{ar}$).

According to another embodiment, the copolyamide is the condensation product of a mixture comprising:
  1,4-cyclohexanedicarboxylic acid of formula (II)

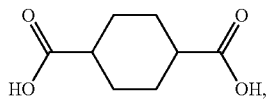

a diamine of formula (III):

(III) and,
at least one of:
  an aromatic diacid ($DA_{ar}$), or derivative thereof or
  an aliphatic diamine ($NN_{al}$), or derivative thereof.

According to this embodiment, the copolyamide may for example be the condensation product of a mixture comprising 1,4-CHDA (II), the diamine of formula (III), at least one aromatic diacid ($DA_{ar}$) and at least one aliphatic diamine ($NN_{al}$).

Non limitative examples of aromatic diamines ($NN_{ar}$) are notably m-phenylene diamine (MPD), p-phenylene diamine (PPD), 3,4'-diaminodiphenyl ether (3,4'-ODA), 4,4'-diaminodiphenyl ether (4,4'-ODA) p-xylylene diamine (PXDA) and m-xylylenediamine (MXDA).

Non limitative examples of aliphatic diacids ($DA_{al}$) are notably oxalic acid (HOOC—COOH), malonic acid (HOOC—$CH_2$—COOH), succinic acid [HOOC—$(CH_2)_2$—COOH], glutaric acid [HOOC—$(CH_2)_3$—COOH], 2,2-dimethyl-glutaric acid [HOOC-C$(CH_3)_2$—$(CH_2)_2$—COOH], adipic acid [HOOC—$(CH_2)_4$—COOH], 2,4,4-trimethyl-adipic acid [HOOC—CH$(CH_3)$—$CH_2$—C$(CH_3)_2$—$CH_2$—COOH], pimelic acid [HOOC-$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecandioic acid [HOOC—$(CH_2)_{10}$—COOH] and tetradecandioic acid [HOOC—$(CH_2)_{11}$—COOH].

Non limitative examples of aliphatic diamines ($NN_{al}$) are notably 1,2-diaminoethane, 1,2-diaminopropane, propylene-1,3-diamine, 1,3-diaminobutane, 1,4-diaminobutane (putrescine), 1,5-diaminopentane (cadaverine), 2-methyl-1,5-diaminopentane, hexamethylenediamine, 3-methylhexamethylenediamine, 2,5 dimethylhexamethylenediamine, 2,2,4-trimethyl-hexamethylenediamine, 2,4,4-trimethyl-hexamethylenediamine, 1,7-diaminoheptane, 1,8-diaminooctane, 2,2,7,7-tetramethyloctamethylenediamine, 1,9-diaminononane, 5-methyl-1,9-diaminononane, 1,10-diaminodecane, 1,11-diaminoundecane, 1,12diaminododecane and N,N-Bis(3-aminopropyl)methylamine.

The aliphatic diamines ($NN_{al}$) can also be selected in the group of the polyetherdiamines. The polyetherdiamines can be based on a ethoxylated (EO) backbone and/or on a propoxylated (PO) backbone and they can be ethylene-oxide terminated, propylene-oxide terminated or butylene-oxide terminated diamines. Such polyetherdiamines are for example sold under the trade name Jeffamine® and Elastamine® (Hunstman). A specific example of such a polyetherdiamine is the diamine of formula (IV):

(IV).

Non limitative examples of aromatic diacids ($DA_{ar}$) are notably phthalic acids, including isophthalic acid (IPA), terephthalic acid (TPA), naphthalenedicarboxylic acids (e.g. naphthalene-2,6-dicarboxylic acid), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene.

According to an embodiment of the present invention, the (co)polyamide is the condensation product of the mixture comprising:
  1,4-cyclohexanedicarboxylic acid of formula (II)

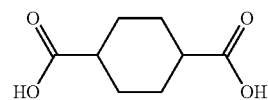

a diamine of formula (III):

(III) and at least one of:
  a diamine (NN) selected from the group consisting of 1,4-diaminobutane, 1,5-diamonopentane, 1,6-diaminohexane, 1,10-diaminedecane, $H_2N$—$(CH_2)_3$—O—$(CH_2)_2$—O$(CH_2)_3$—$NH_2$ and m-xylylene diamine, or
  a diacid (DA) selected from the group consisting of adipic acid, sebacic acid, isophthalic acid, terephthalic acid, 5-hydroxyisophthalic acid and 5-sulfophthalic acid.

According to this embodiment, the copolyamide may for example be the condensation product of a mixture comprising 1,4-CHDA (II), the diamine of formula (III), at least one diacid (DA) selected from the group consisting of adipic acid, sebacic acid, isophthalic acid, terephthalic acid, 5-hydroxyisophthalic acid and 5-sulfophthalic acid, and at least one diamine (NN) selected from the group consisting of 1,4-diaminobutane, 1,5-diamonopentane, 1,6-diaminohexane, 1,10-diaminedecane, $H_2N$-$(CH_2)_3$—O—$(CH_2)_2$—O$(CH_2)_3$—$NH_2$ and m-xylylene diamine.

According to an embodiment, the molar ratio $n_{diacid}/n_{diamine}$ ranges from 0.8 to 1.2. In the context of the present invention, the term "$n_{diacid}$" means total number of moles of diacid species e.g. involved in the condensation process. Similarly, the term "$n_{diamine}$" means total number of moles of diamine species e.g. involved in the condensation process. As an example, if the condensation process involves one additional diacid species, in addition to 1,4-CHDA of formula (II), then $n_{diacid}=n_{1,4-CHDA}+n_{DA}$. According to the present invention, the molar ratio $n_{diacid}/n_{diamine}$ may range between 0.8 and 1.2, between 0.9 and 1.1, between 0.95 and 1.05 or between 0.98 and 1.02.

According to an embodiment, the (co)polyamide of the present invention has a melting point of at least about 260° C., as determined according to ASTM D3418. According to this embodiment, the (co)polyamide of the present invention may have for example a melting point of at least about 270° C., at least about 280° C. or at least about 290° C.

According to an embodiment, the (co)polyamide of the present invention has a water uptake at saturation, by immersion in water at 23° C. of at least 2 wt. %. According to this embodiment, the (co)polyamide of the present invention may have for example a water uptake at saturation, by immersion in water at 23° C. of at least 3 wt. %, at least 4 wt. %, at least 5 wt. % or at least 10 wt. %. The Water uptake at 23° C. can for example be determined by providing a specimen shaped according to ISO527 in its dry state (moisture content of less than 0.2 wt. %), immersing the same in deionized water at 23° C., until reaching a constant weight. The water uptake is calculated according to the formula:

$$\text{Water uptake} = \frac{W_{after} - W_{before}}{W_{before}} \times 100$$

wherein $W_{before}$ is the weight of the shaped specimen in its original dry state and $W_{after}$ is the weight of the shaped specimen after water uptake.

According to an embodiment, the (co)polyamide of the present invention has a solubility in water of at least 50 wt. %, at least 60wt. %, at least 70 wt. %, at least 80 wt. %, at least 90 wt. % or 100 wt. % at a concentration of 5 g/L, at 110° C., under atmospheric pressure. According to this embodiment, the (co)polyamide of the present invention may have for example a solubility in water of at least 50 wt. %, at least 60 wt. %, at least 70 wt. %, at least 80 wt. %, at least 90 wt. % or 100 wt. % at a concentration of 5 g/L, at 90° C. under atmospheric pressure, or a solubility in water of at least 50 wt. %, at least 60wt. %, at least 70 wt. %, at least 80 wt. %, at least 90 wt. % or 100 wt. % at a concentration of 5 g/L, at 70° C., under atmospheric pressure.

One or more end capping agents can be used and added to the condensation mixtures above described. The capping agent can for example be selected from the group consisting of an acid comprising only one carboxylic function and an amine comprising only one amine function. Examples of end capping agents are acetic acid, propanoic acid, benzoic acid, benzylamine, 1-aminohexane and 1-aminododecane.

According to an embodiment of the present invention, the (co)polyamide does not comprise diacid having greater than or equal to 36 carbon atoms or comprises such a diacid in an amount not exceeding 5 mol. %, 4 mol. % or 3 mol. %, based on the total number of moles used to prepare the (co)polyamide.

The (co)polyamide of the present invention can be prepared by any conventional method, for example, by thermal polycondensation in solution.

Polyamide Composition

The polyamide composition (C) comprises the (co)polyamides of the present invention, above described.

The (co)polyamides may be present in the composition (C) in a total amount of greater than 30 wt. %, greater than 35 wt. % by weight, greater than 40 wt. % or greater than 45 wt. %, based on the total weight of the polymer composition (C). The (co)polyamides may be present in the composition (C) in a total amount of less than 90 wt. %, less than 80 wt. %, less than 70 wt. % or less than 60 wt. %, based on the total weight of the polymer composition (C).

The (co)polyamides may for example be present in the composition (C) in an amount ranging between 35 and 60 wt. %, for example between 40 and 55 wt. %, based on the total weight of the polyamide composition (C).

The composition (C) may also comprise one component selected from the group consisting of reinforcing agents, tougheners, plasticizers, colorants, pigments, antistatic agents, dyes, lubricants, thermal stabilizers, light stabilizers, flame retardants, nucleating agents and antioxidants.

A large selection of reinforcing agents, also called reinforcing fibers or fillers, may be added to the composition according to the present invention. They can be selected from fibrous and particulate reinforcing agents. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50.

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may be present in the composition (C) in a total amount of greater than 15 wt. %, greater than 20 wt. % by weight, greater than 25 wt. % or greater than 30 wt. %, based on the total weight of the polymer composition (C). The reinforcing agents may be present in the composition (C) in a total amount of less than 65 wt. %, less than 60 wt. %, less than 55 wt. % or less than 50 wt. %, based on the total weight of the polymer composition (C).

The reinforcing filler may for example be present in the composition (C) in an amount ranging between 20 and 60 wt. %, for example between 30 and 50 wt. %, based on the total weight of the polyamide composition (C).

The composition (C) of the present invention may also comprise a toughener. A toughener is generally a low glass transition temperature ($T_g$) polymer, with a $T_g$ for example below room temperature, below 0° C. or even below −25° C. As a result of its low $T_g$, the toughener are typically elastomeric at room temperature. Tougheners can be functionalized polymer backbones.

The polymer backbone of the toughener can be selected from elastomeric backbones comprising polyethylenes and copolymers thereof, e.g. ethylene-butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS); core-shell elastomers of methacrylate-butadiene-styrene (MBS) type, or mixture of one or more of the above.

When the toughener is functionalized, the functionalization of the backbone can result from the copolymerization of monomers which include the functionalization or from the grafting of the polymer backbone with a further component.

Specific examples of functionalized tougheners are notably terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene-maleimide copolymers grafted with maleic anhydride; SEBS copolymers grafted with maleic anhydride; styrene-acrylonitrile copolymers grafted with maleic anhydride; ABS copolymers grafted with maleic anhydride.

The toughener may be present in the composition (C) in a total amount of greater than 1 wt. %, greater than 2 wt. % or greater than 3 wt. %, based on the total weight of the composition (C). The toughener may be present in the composition (C) in a total amount of less than 30 wt. %, less than 20 wt. %, less than 15 wt. % or less than 10 wt. %, based on the total weight of the polymer composition (C).

The composition (C) may also comprise other conventional additives commonly used in the art, including plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

The composition (C) may also comprise one or more other polymers, preferably (co)polyamides different from the (co)polyamide of the present invention. Mention can be made notably of semi-crystalline or amorphous polyamides, such as aliphatic polyamides, semi-aromatic polyamides, and more generally the polyamides obtained by polycondensation between an aromatic or aliphatic saturated diacid and an aliphatic saturated or aromatic primary diamine, a lactam, an amino-acid or a mixture of these different monomers.

Preparation of the Composition (C)

The invention further pertains to a method of making the composition (C) as above detailed, said method comprising melt-blending the (co)polyamide and the specific components, e.g. a filler, a toughener, a stabilizer, and of any other optional additives.

Any melt-blending method may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

Articles

The present invention also relates to the articles comprising the (co)polyamide of the present invention, described above or the (co)polyamide composition of the present invention, described above.

According to an embodiment, the article comprising the (co)polyamide of the present invention of the composition (C) of the present invention is provided in a dry state, and has a moisture content of less than 0.5 wt. %, or less than 0.2 wt. %, with respect to the total weight of the article.

The article can notably be a fracking ball (facturing ball or frac ball) used in oil and gas extraction, e.g. inserted into wells to build up pressure in the ground. They are put under various conditions and should notably withstand high temperatures and pressure. Frac balls can be used in methods of creating fractures in a zone of a subterranean formation.

The article made of the (co)polyamide or (co)polyamide composition of the present invention can also be used in the medical field, e.g. as a resorbable suture thread or dissolvable implants.

The article can be molded from the (co)polyamide or (co)polyamide composition of the present invention, by any process adapted to thermoplastics, e.g. extrusion, injection molding, blow molding, rotomolding or compression molding.

The article made of the (co)polyamide or (co)polyamide composition of the present invention can also be in the form of a thread or a filament to be used in a process of 3D printing (e.g. Fused Filament Fabrication).

Use of the (Co)Polyamides, Composition (C) and Articles

The (co)polyamide or (co)polyamide composition of the present invention can be used as support materials to print 3D parts. Supports material are required during 3D printing to provide vertical and/or lateral support in the higher operating conditions required for the high-temperature part materials (e.g. PEEK requiring a processing temperature around 360-400° C.). 3D printing support materials present a high temperature resistance, so as not to soften under the high temperature operating conditions. Support material also present water absorption behaviour such to enable sufficient swelling and deformation upon exposure to moisture. The (co)polyamide of the present invention presenting a thermal stability at high operating temperature and a sufficient solubility in water to be detached from a printed part, is particularly adapted as a material used to prepare 3D-printing detachable support materials.

The (co)polyamide or (co)polyamide composition of the present invention can be used in oil and gas extraction applications, for example to prepare articles presenting a thermal stability at high operating temperature and a sufficient solubility in water to be dissolved when needed during the process, for example after extraction.

The (co)polyamide or (co)polyamide composition of the present invention can also be used as a sizing agent, e.g. to treat/coat polymer fibers (e.g. polyamide fibers) or carbon fibers.

The (co)polyamide or (co)polyamide composition of the present invention can also be used in the medical field, for example to prepare resorbable or dissolvable materials, e.g. in the form of a thread or implantable articles.

Should the disclosure of any patents, patent applications, and publications which are incorporated herein by reference conflict with the description of the present application to the extent that it may render a term unclear, the present description shall take precedence.

EXAMPLES

Raw Materials

Jeffamine® EDR-148 polyetheramine, 2,2'-(ethylenedioxy)bis(ethylamine), presenting the following formula:

Jeffamine® EDR-176 polyetheramine, ethylene glycol bis(3-aminopropyl)ether, presenting the following formula:

Jeffamine® D-230 polyetheramine, poly(propylene glycol) bis(2-aminopropyl ether) presenting the following formula:

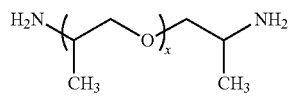

in which x is 2.5.

Terephthalic acid (Flint Hills Resources)
1,4-cyclohexanedicarboxylic acid (Eastman Chemical Products)
Adipic acid (Koch Industries)
Sebacic acid (Aldrich Chemical Company)
Isophthalic acid (Flint Hills Resources)
5-hydroxyisophthalic acid (Aldrich Chemical Company)
5-sulfoisophthalic acid, sodium salt (Aldrich Chemical Company)
5-sulfoisophthalic acid, monolithium salt (Aldrich Chemical Company)

(Co)polyamides Preparation

All of the (co)polyamides C1-C3 and 1-8 were prepared according to a similar process in an electrically-heated reactor equipped with a stirrer and a distillate line equipped with a pressure regulation valve. For composition 1, the reactor was charged with 9.08 g (0.053 mol) of 1,4-cyclohexane dicarboxylic acid, 7.86 g (0.053 mol) of 2,2'-(ethylenedioxy)bis(ethylamine), 0.0052 g $H_3PO_3$ and 11 g of deionized water. The reactor was sealed, the pressure release valve was set to 17 bar and the reaction mixture was heated to 260° C. in 45 minutes. Pressure was incrementally reduced to atmospheric pressure while increasing internal temperature to 300° C. The reaction mixture was kept at 300° C. for 15 min and then cooled down to 200° C. within 1 hour and then to room temperature.

Composition 9 was produced in a jacketed stainless steel reactor equipped with a double helicon ribbon agitator and heated through circulation of Therminol 66. The reactor was charged with 1.876 kg (12.66 mol) 2,2'-(ethylenedioxy)bis(ethylamine), 1.525 kg (8.857 mol) 1,4-cyclohexanedicarboxylic acid, 0.555 kg (3.798 mol) adipic acid and 1.726 kg water, purged with nitrogen and heated to 220° C. with the pressure release valve set at 17 bar. After reaching 17 bar and 213° C., the temperature was increased to 280° C. within 100 minutes. The pressure was then reduced to atmospheric and the temperature increased to 295° C. over a period of 35 minutes. Vacuum was introduced over 10 minutes and then the reaction mixture was held at 400 mbar for 20 min. The polymer was discharged and quenched on stainless steel trays cooled on dry-ice to yield 3.3 kg polymer. The solidified polymer was ground and dried under vacuum for 16 h at 90° C. Polymer was molded into rheology discs using a DSM XPlore® mini-compounder and micro-molding machine.

Testing

Melting Temperatures (Tm)

The melting temperatures of the various (co)polyamides were measured using differential scanning calorimetry according to ASTM D3418 employing a heating and cooling rate of 20° C./min. Three scans were used for each DSC test: a first heat up to 330° C., followed by a first cool down to 50° C., followed by a second heat up to 330° C. The Tm was determined from the second heat up as the peak temperature on the melting endotherm. The melting temperatures for the (co)polyamides of the invention and comparative examples are tabulated in Tables 1 and 2.

Dissolution/Solubility Test

Solubility was demonstrated by solution transparency or by significant polymer dispersion as a suspension of fine particles.

Solubility testing was carried out in three solvents: distilled water, water supplemented with 0.1 M $H_3PO_4$ and water supplemented with 0.1 M NaOH. 0.05 g of sample was placed in a scintillation vial equipped with a reflux condenser and magnetic stir bar with 10 mL of one of the three solvents. Stirring was conducted for 30 minutes at room temperature, followed by visual inspection. Then the temperature was increased by 10° C., followed by visual inspection. These steps were repeated until the sample was completely dissolved or until the heating block temperature had reached 110° C. Dissolution was considered complete when the solution was either transparent or cloudy with fine suspended particles.

Results:

TABLE 1

| | | C1 | C2 | C3 | 1 | 2 | 3 |
|---|---|---|---|---|---|---|---|
| Diamine n (mol) | EDR-148 | 1 | — | — | 1 | 1 | 0.9 |
| | EDR-176 | — | 1 | — | — | — | 0.1 |
| | D-230 | — | — | 1 | — | — | — |
| Diacid n (mol) | Terephthalic acid | 1 | — | — | — | — | — |
| | 1,4-CHDA | — | 1 | 1 | 1 | 0.95 | 1 |
| | Adipic acid | — | — | — | — | — | — |
| | Sebacic acid | — | — | — | — | 0.05 | — |
| $T_m$ (° C.) | | 251 | 257 | 191 | 311 | 300 | 296 |
| T° C. for dissolution in given solvent | Distilled water | 110 | 90 | Ins | 110 (80 wt. %) | 100 | 110 |
| | 0.1M $H_3PO_4$ | 90 | 80 | 70 | 90 | 110 | 100 |
| | 0.1M NaOH | 110 | 80 | 90 | 80 | 100 | 80 |
| $M_N$ (g/mol) | | 7,200 | 13,000 | 6,900 | 10,000 | 11,000 | 7,700 |

Ins means a solubility < to 50 wt. % at 110° C.

TABLE 2

| | | 4 | 5 | 6 | 7 | 8 | 9 |
|---|---|---|---|---|---|---|---|
| Diamine n (mol) | EDR-148 | 1 | 1 | 1 | 1 | 1 | 1 |
| Diacid n (mol) | 1,4-CHDA | 0.95 | 0.95 | 0.95 | 0.9 | 0.85 | 0.7 |
| | Adipic acid | — | — | — | 0.1 | — | 0.3 |
| | Sebacic acid | — | — | — | — | — | — |
| | Isophthalic acid | — | — | — | — | 0.15 | — |

TABLE 2-continued

|  | 4 | 5 | 6 | 7 | 8 | 9 |
|---|---|---|---|---|---|---|
| 5-hydroxy-iso-phthalic acid | 0.05 | — | — | — | — | — |
| 5-sulfoiso-phthalic acid, sodium salt | — | — | 0.05 | — | — | — |
| 5-sulfoiso-phthalic acid, mono-lithium salt | — | 0.05 | — | — | — | — |
| $T_m$ (° C.) | 289 | 276 | 282 | 305 | 283 | 265 |
| T° C. for dissolution in given solvent | Distilled water | 50 | 60 | 60 | 110 (80 wt. %) | 70 | 60 |
|  | 0.1 M $H_3PO_4$ | 60 | 50 | 90 | 90 | 40 | 50 |
|  | 0.1 M NaOH | 50 | 40 | 50 | 80 | 50 | 25 |
| $M_N$ (g/mol) |  | 8,500 | 7,300 | 10,000 | 11,000 | 7,700 | 10,000 |

The polyamide of C1, prepared from terephtalic acid and EDR-148 presents a solubility of 100% at 5 g/L at 110° C. under atmospheric pressure in distilled water, but a melting point lower than 260° C. The polyamide of C2, prepared from 1,4-CHDA and EDR-176 presents a melting point lower than 260° C. The polyamide of C3, prepared from 1,4-CHDA and D-230 presents a melting point significantly lower than 260° C., and is insoluble in distilled water at 5 g/L at 110° C. under atmospheric pressure. The polyamides C1, C2 and C3 are not adapted to high temperature applications requiring sufficient swelling or deformation upon exposure to moisture, such as for example oil and gas extraction processes (e.g. fracturing balls), or as support materials used to print three-dimensional (3D) parts. The polyamides 1 to 9 on the other hand present both a melting point above 260° C. and sufficient solubility into water (distilled water, water supplemented with 0.1 M $H_3PO_4$ and water supplemented with 0.1 M NaOH) at 110° C. or even less. The polyamides of examples 1 and 7 were 80 wt. % soluble at 110° C. All of the polyamides of the examples 1-9 are well adapted to the aforementioned applications.

The invention claimed is:

1. A (co)polyamide for use as a support material for 3D printing comprising at least 60 mol. % of recurring units of formula (I):

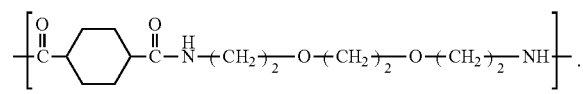

(I)

2. The (co)polyamide of claim 1, wherein the (co)polyamide is a condensation product of a mixture comprising:

1,4-cyclohexanedicarboxylic acid of formula (II):

(II)

and
a diamine of formula (III):

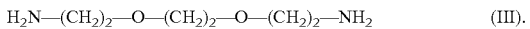

(III).

3. The (co)polyamide of claim 2, wherein the (co)polyamide is the condensation product of the mixture further comprising one diacid (DA) selected from the group consisting of adipic acid, sebacic acid, isophthalic acid, terephthalic acid, 5-hydroxyisophthalic acid, and 5-sulfophthalic acid.

4. The polyamide of claim 2, wherein the (co)polyamide is the condensation product of the mixture further comprising one diamine (NN) selected from the group consisting of 1,4-diaminobutane, 1,5-diamonopentane, 1,6-diaminohexane, 1,10-diaminedecane, $H_2N-(CH_2)_3-O-(CH_2)_2-O(CH_2)_3-NH_2$, and m-xylylene diamine.

5. The (co)polyamide of claim 4, wherein the diamine (NN) is of formula (IV):

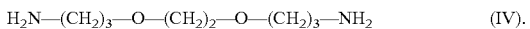

(IV).

6. The (co)polyamide of claim 2 comprising a molar ratio $n_{diacid}/n_{diamine}$ ranging from 0.8 to 1.2.

7. The (co)polyamide of claim 1, wherein the (co)polyamide has a melting point of at least 260° C., as determined according to ASTM D3418.

8. The (co)polyamide of claim 1, wherein the (co)polyamide has a water uptake at saturation, by immersion in water at 23° C. of at least 2 wt. %.

9. The (co)polyamide of claim 1, wherein the (co)polyamide has a solubility in water of at least 50 wt. % at a concentration of 5 g/L, at 110° C., under atmospheric pressure.

10. The (co)polyamide of claim 1, wherein the number average molecular weight $M_N$ of the (co)polyamide ranges from 1,000 to 40,000 g/mol, as determined by GPC.

11. A (co)polyamide composition comprising:
at least one (co)polyamide according to claim 1, and
at least one component selected from the group consisting of reinforcing agents, tougheners, plasticizers, colorants, pigments, antistatic agents, dyes, lubricants, thermal stabilizers, light stabilizers, flame retardants, nucleating agents, antioxidants, and mixtures thereof.

12. An article comprising the (co)polyamide of claim 1.

13. The article of claim 12, provided in a dry state, having a moisture content of less than 0.5 wt. %, with respect to a total weight of the support material.

14. A support material to print 3D parts comprising the article of claim 12.

15. Polymer fibers or carbon fibers coated with the article of claim 12.

16. The article of claim 13 having a moisture content of less than 0.2 wt. %, with respect to the total weight of the support material.

* * * * *